Figure 1:
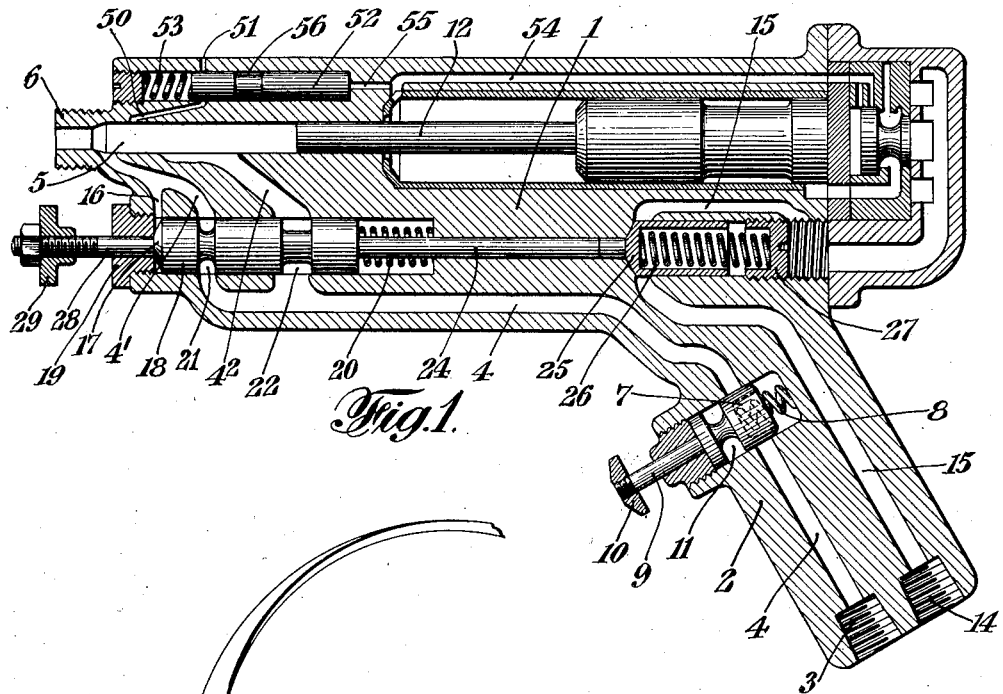

Dec. 15, 1931.  A. E. HORMAN  1,836,597
LUBRICATING DEVICE
Filed Jan. 16, 1929

INVENTOR
Alfred E. Horman
BY Kenyon & Kenyon
ATTORNEYS

Patented Dec. 15, 1931

1,836,597

UNITED STATES PATENT OFFICE

ALFRED E. HORMAN, OF NEW YORK, N. Y.

LUBRICATING DEVICE

Application filed January 16, 1929. Serial No. 332,801.

My invention relates to lubricating devices and methods and more particularly to a device and method whereby a lubricant, such as grease, may be readily supplied to motor car bearings.

One of the objects of the invention is to provide an improved device and method of this character whereby the lubricant may be effectively supplied to the bearings even when there is a considerable resistance to the flow of the lubricant, as when the bearings contain caked grease.

Another object of the invention is to provide an improved lubricating device whereby air entrapped in the lubricant is caused to escape from the lubricant to the atmosphere.

Other objects, features and advantages will appear more fully from the following detailed description and appended claims.

Figure 2:
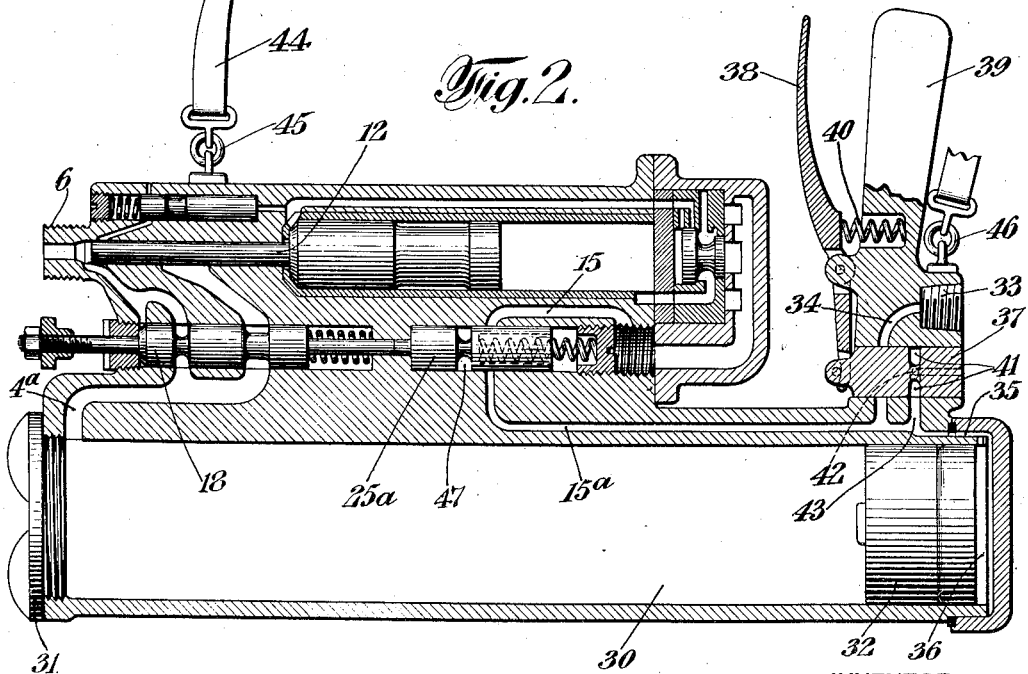

In the drawings,

Figure 1 is a central vertical cross section of one embodiment of my invention; and Figure 2 is a like view of another embodiment.

In both of the figures like parts are designated by the same reference characters.

Referring to Fig. 1, the device comprises an elongated horizontal body 1 provided with a handle portion 2 extending downwardly and to the rear of the device. The part 2 of the body is provided with a threaded portion 3 for connection with a source of lubricant supply, such as a tank containing lubricant under a relatively low pressure, say from 100 to 150 pounds per square inch. The connection 3 communicates with a passage 4 extending longitudinally through the part 2 of the body and then longitudinally along the main part of the body, this passage having forward portions 4' and 4² extending upwardly into communication with the bore or passage 5 communicating with a threaded nipple 6. To this nipple there may be connected a flexible tubing (not shown) as well-known in the art, whereby the lubricant may be conveyed to the bearings to be lubricated. The flow of lubricant through the passage 4 is normally prevented by a valve 7 which is yieldingly held in it closed position as by a spring 8. The valve stem 9 has secured thereto a button 10 which may be pressed by the operator to force the valve 7 inwardly against the action of the spring 8 to bring the annular passage 11 in the valve in communication with the passage 4 and thereby permit the flow of the lubricant through the latter passage.

Arranged to reciprocate in the bore 5 is a hammer 12 which when reciprocated will by repeated impact upon the lubricant effectively force it through the outlet 6 towards the part to be lubricated. The hammer shown is of the pneumatic type, the air therefor being supplied to the threaded connection 14 and from there through the passage 15 to the hammer mechanism. As such hammer mechanisms are well known in the art, a detailed description thereof is thought to be unnecessary.

The resistance to the flow of the lubricant may be comparatively slight, as when the bearings to be lubricated are new and clean. Under these circumstances the relatively low pressure under which the lubricant is applied to the passage 4 may cause a sufficient flow of the lubricant. I accordingly provide mechanism whereby the hammer 12 is brought into operation only when the resistance to the flow of the lubricant reaches a predetermined point. To this end a passage 16 is arranged to extend downwardly from the passage 4' to the forward face 17 of the valve member 18 arranged to reciprocate longitudinally in the body 1. This valve member is normally held in its forward position against its seat 19 by spring 20. It contains annular recesses 21 and 22 which register respectively with the passages 4' and 4² when the valve is in its forward position so as to permit the flow of lubricant through said passages. When, however, the valve is moved rearwardly these annular recesses 21 and 22 are moved out of register with the passages 4' and 4² respectively and the valve serves to prevent the flow of lubricant through said passages. The valve 18 has a rearwardly extending stem 24 which is adapted when moved rearwardly to engage and open a valve 25 which normally shuts off the flow of air through the passage 15. The valve 25 is as shown held to its seat by a spring 26. The tension of the spring may be adjusted by changing the position of the threaded seat 27 against which the spring bears. The rearward movement of the valve 18 is limited by the adjustable stop 29 arranged on the forwardly extending stem 28 of the valve. In order to prevent interference with the action of the hammer by air pocketed in the grease, I provide a vent 50, 51 which is normally closed by valve 52 yieldingly held in closed position by spring 53. When the air is admitted to the hammer it flows from passage 54 in the hammer through port 55 to shift valve 52 against the pressure of spring 53, bringing the annular recess 56 of the valve into register with the vent ports 50 and 51 and thereby permitting the exhaust of the air from the grease through the said vent ports.

In operation the lubricant, such as grease, flows into the passage 4 under a predetermined light pressure. The connection affixed to the nipple 6 having been applied to the part to be lubricated, the operator presses the button 10 whereupon the lubricant passes through the passage 4, 4' into the passage 5 and thence through the flexible connection not shown to the part to be lubricated. If the hammer 2 is in its rearward position so as to leave the upper end of the passage $4^2$ uncovered the lubricant will also pass through that passage to the passage 5. If the hammer 12 should be in its forward position as to shut off the passage $4^2$ from the passage 5 the pressure of the lubricant on the forward end of the hammer will force the latter back so as to place the passage $4^2$ in communication with the passage 5. The lubricant now flows to the part to be lubricated under the relatively low pressure under which the lubricant is supplied to the passage 4. In case the resistance to the flow of the lubricant increases above the pressure under which the lubricant is supplied to the passage 4, a back pressure is set up in the lubricant, this pressure being transmitted through the lubricant in the passage 16 against the face 17 of the valve 18, causing the latter to shift rearwardly and thereby moving the recess 21 out of register with the passage 4' and the recess 22 more or less out of register with the passage $4^2$. This cuts down the supply of lubricant and thereby itself tends to automatically diminish the back pressure. In case, however, of a further increase of the back pressure, the rearwardly moving stem 24 of the valve 18 opens the valve 25 admitting air to the hammer, causing the plunger 12 of the hammer to reciprocate rapidly and by its repeated impact upon the lubricant to drive it forcibly through the outlet 6 and through the flexible connection annexed thereto to the part to be lubricated. At the same time any caked lubricant which may be located in the part being lubricated is forced therefrom by the fresh lubricant. When the resistance to the flow of the lubricant drops again to a pressure no greater than that under which the lubricant is supplied to the passage 4, the valve 18 is again moved by the spring 20 to its forward open position, the valve 25 automatically closes, the hammer ceases to operate, and the flow of the lubricant continues under a light pressure until the operator permits the valve 10 to close. In case the hammer should jam and for that reason cease to operate, the valve 10 is released to shut off the supply of lubricant and the valve stem 28 is pushed inwardly thereby causing the hammer to operate until the jam is relieved. In case the hammer should fail to stop, it is simply necessary to pull out the stop 29 and valve stem 28 to shut off the supply of air to the hammer and thereby stop the same. The minimum grease feed through the recess 22 and passage $4^2$ may be adjusted by varying the position of the stop 29.

In Fig. 2 I have shown my invention applied to a portable lubricating device having a lubricant container 30 which may contain for example sufficient grease for lubricating a motor car. To permit placing the grease in the container, the latter is provided with a removable end 31 detachably connected to the container as by screw threads. The lubricant is adapted to be forced into the passage $4a$ corresponding to the passage 4 in Fig. 1 by means of a piston 32 which is arranged to be acted upon by supply of air to force the lubricant through the passage $4a$ under a uniform relatively low pressure. The air supply is connected to the device through the threaded connection 33, flowing thence through passage 34 to the passage $15a$ corresponding to the passage 15 in Fig. 1. The passage 34 also communicates through the passage 35 with the space 36 to the rear of the piston 32.

In this embodiment of the invention the supply of the lubricant at uniform pressure is normally shut off by valve 37 which shuts off the supply of air through the passage 34. For operating the valve 37 a lever 38 is provided, the lower end of this lever being connected with the valve and the upper end being arranged so as to be capable of being pressed by the operator towards the handle 39. A spring 40 tends yieldingly to hold the lever 38 in position to close the valve 37. When the valve is in open position its annular recess 41 communicates with the passage 34. When it is in closed position the air vent 42 in the body communicates through recess 41 with the passage 43 to permit the escape of air from the space in the container to the rear of the piston 32 when filling the container 30.

To permit the device to be readily carried by the operator, I have shown a strap 44 connected to the device as by rings 45 and 46.

In this embodiment of the invention the valve $25a$ corresponding to the valve 25 of Fig. 1 is provided with an annular passage 47 to permit communication to be established between the passage 15a and the upper passage 15.

In operation after the flexible connection secured to the nipple 6 has been applied to the part to be lubricated, the lever 38 is pressed towards the handle 39 whereupon the valve 37 is opened, compressed air is admitted to the rear of the piston 32 and the lubricant is forced through the passage 4a corresponding to the passage 4 in Fig. 1 under a uniform relatively low pressure. The rest of the operation is the same as in the form of invention shown in Fig. 1, the lubricant flowing under low pressure to the part to be lubricated until the resistance to the flow is sufficient to cause the valve 18 to move rearwardly and open the valve 25a whereupon the hammer 12 is set into operation driving the lubricant forward by repeated impact.

While I have described certain embodiments of my invention it is to be understood that I am not limited thereto and that changes within the scope of the appended claims may be made without departing from the spirit of the invention.

I claim:

1. In combination, a cylinder, means for passing lubricant therethrough under pressure, a pneumatic hammer for applying increased pressure to lubricant in the cylinder, and means responsive to the pressure in said cylinder for controlling the operation of the pneumatic hammer.

2. In combination, a cylinder, means for passing lubricant therethrough under pressure, means actuatable by an operator for controlling the flow of lubricant, a pneumatic hammer for applying increased force to lubricant in said cylinder, and means responsive to the pressure in said cylinder for controlling the operation of said pneumatic hammer.

3. In combination, means for passing lubricant therethrough under pressure, manually operable means for controlling the supply of lubricant, a pneumatic hammer for applying increased pressure to lubricant in the cylinder, means responsive to the pressure in said cylinder for controlling the operation of said pneumatic hammer, and means for automatically effecting exhaust of air from the cylinder.

4. In combination, a cylinder, means for passing lubricant therethrough under pressure, a pneumatic hammer for applying increased pressure to lubricant in the cylinder, a vent from said cylinder for the escape of entrapped air from the lubricant, a valve for said vent, and pneumatically operated means for opening said valve upon operation of said pneumatic hammer.

5. In combination, a cylinder having an axial outlet and a lateral inlet, means for supplying lubricant through said inlet into said cylinder under pressure, a piston reciprocable in said cylinder to close said inlet and force lubricant through said outlet, pneumatic means for actuating said piston, and means responsive to the pressure in said cylinder for controlling the operation of said pneumatic means.

In testimony whereof, I have signed my name to this specification.

ALFRED E. HORMAN.